Feb. 27, 1951  A. K. MARSH  2,543,323
APPLYING FLAG TYPE LABELS TO ELECTRIC CORDS OR
OTHER CYLINDRICAL ARTICLES
Filed April 20, 1948  6 Sheets-Sheet 1

FIG.1.

INVENTOR.
Alonzo K. Marsh
BY Emery, Varney,
Whittemore & Dix
ATTORNEYS.

Feb. 27, 1951  A. K. MARSH  2,543,323
APPLYING FLAG TYPE LABELS TO ELECTRIC CORDS OR
OTHER CYLINDRICAL ARTICLES
Filed April 20, 1948  6 Sheets-Sheet 5

INVENTOR.
Alonzo K. Marsh
BY Emery, Varney,
Whittemore & Dix
ATTORNEYS.

Feb. 27, 1951 A. K. MARSH 2,543,323
APPLYING FLAG TYPE LABELS TO ELECTRIC CORDS OR
OTHER CYLINDRICAL ARTICLES
Filed April 20, 1948 6 Sheets-Sheet 6

INVENTOR.
Alonzo K. Marsh
BY Emery, Varney,
Whittemore & Dix
ATTORNEYS.

Patented Feb. 27, 1951

2,543,323

UNITED STATES PATENT OFFICE 2,543,323

APPLYING FLAG TYPE LABELS TO ELECTRIC CORDS OR OTHER CYLINDRICAL ARTICLES

Alonzo K. Marsh, Ridgewood, N. J., assignor to A. Kimball Company, New York, N. Y., a corporation of New York Application April 20, 1948, Serial No. 22,095

25 Claims. (Cl. 216—30)

This invention relates to apparatus for applying flag type labels with thermo-plastic or pressure sensitive adhesive to electric cords or other similarly shaped articles, and either before or after the electric cord has been attached to a plug or other fitting. The invention is particularly concerned with flag labels with thermoplastic adhesive which will be used for indicating Underwriters Laboratories, Inc., approval of the cord or cord set.

It is the particular object of this invention to provide an improved labeling machine into which electric cords can be dropped one after another to a label attaching station for automatic attachment of labels to the cords at a rate of approximately one a second. The cords can either be plain or made up into cord sets.

A more particular object of the invention is to provide a machine that automatically attaches an adhesive coated label to an electric cord by wrapping the label tightly around the cord with the ends of the label approximately even, partially sticking the label to the cord and sticking the ends of the label tightly together.

A further particular object of the invention is to provide an improved labeling machine that will operate upon cords of different sizes and shapes without manual adjustment of the machine for the different sizes and shapes.

Further particular objects of the invention are means for starting the machine by the cord as it drops to the label attaching station, means for preventing more than one cord at a time from entering into the label attaching station, means for adjusting the label feed, and means for easily and quickly clearing the machine in case of a jam in the label attaching and sealing mechanism during the operating cycle.

A further particular object of this invention is to provide a hopper into which a number of cords can be dropped and which has mechanism to deliver one cord at a time to the label attaching station.

Other objects, features and advantages of the invention will appear or be pointed out as the description proceeds.

In the drawing forming a part hereof, in which like reference characters indicate corresponding parts in all the views.

Figure 1:
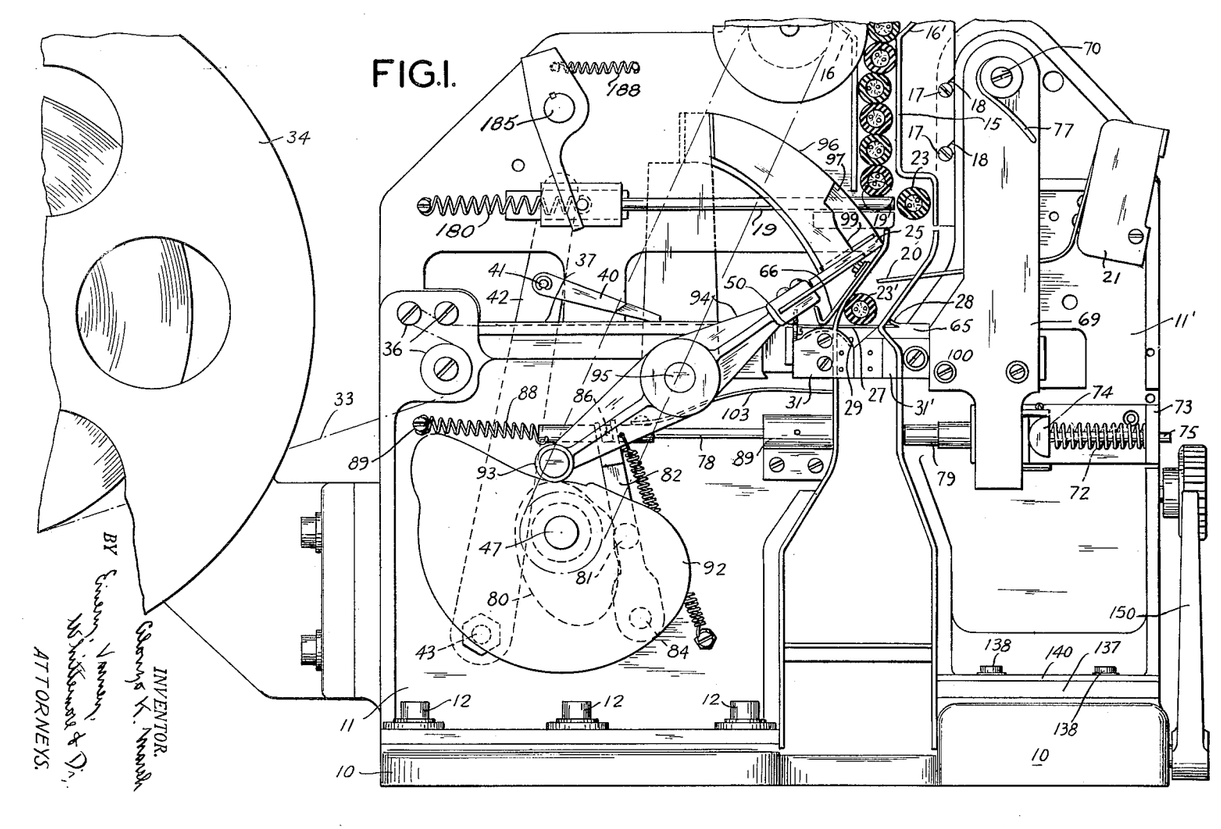
Figure 1 is a front elevation of a label attaching machine embodying this invention.

The machine shown in Figure 1 includes a base 10 and two separate frames 11 and 11'. The frame 11 is secured to the base 10 by fastening elements 12. The other frame 11' is slidable on the base 10 and is locked in position by clamping mechanism that will be described in connection with Figures 5 and 6. There is a chute 15 with its opposite sides connected to the frames 11 and 11', respectively, and diverging side walls 16, and 16' of a hopper at the top of the chute, guide a cord into the chute.

Within a range of cord sizes, for example, from ⅛ to ⅜ inch, in diameter, the same machine can be used for labeling the different sizes of cords without any adjustment other than the adjustment of the width of the chute. The same labels are used, but the flag portions of the labels are longer when the diameter of the cord is smaller.

The cords may be dropped into the chute by hand, a new cord being dropped in for each cycle of operation of the machine. Provision is made for using the machine for labeling cords of different diameter. The right-hand chute wall 16' is connected with the frame 11' by screws 17 which extend through diagonal slots 18 in the supporting portion of the wall 16'. If the screws 17 are loosened, the right-hand chute wall 16' can be moved toward and from the fixed chute wall 16 to widen or narrow the chute 15 to accommodate cords of different diameter. The reason for having the slots 18 extend at an angle to the chute is to increase the height of an offset portion of the chute at the same time that the chute is widened. The stack of cords in the chute 15 rests on a supporting ledge at the offset portion of the chute, and there is a pusher 19 for ejecting one cord at a time from the supporting ledge. This automatic mechanism will be described more fully in connection with Figures 7 and 8. It is sufficient for the present to understand that the pusher 19 ejects a cord from the supporting ledge and causes the cord to drop into the lower portion of the chute at the beginning of each cycle of operation of the machine.

Part way down the chute 15, there is a resilient operating arm 20 of a micro-switch 21 that initiates a new cycle of operation of the machine when a new cord drops down the chute. The weight of a cord 23 striking the operating arm 20 is sufficient to close the micro-switch 21.

After depressing the arm 20, the cord 23 continues down the chute 15 into the position of the cord 23'.

In this position the cord 23' is supported by a label 27 resting on a label holder 28 and the cord is located immediately over a groove 29 formed by the curved upper and forward edges of two sealing elements 31 and 31'.

The label 27 is cut from a label strip 33 which is originally wrapped on a reel 34 and which is drawn from the reel 34 across a series of rollers 36 that take the curl out of the strip. Beyond the rollers 36 the strip is fed through a guide 37 leading to the label support 28. The label strip 33 has spaced feed slots with one perforation for each label; and the stock is fed forward, along the guide 37, by a feed dog 40 that engages the perforations in the label strip.

Figures 3, 4:
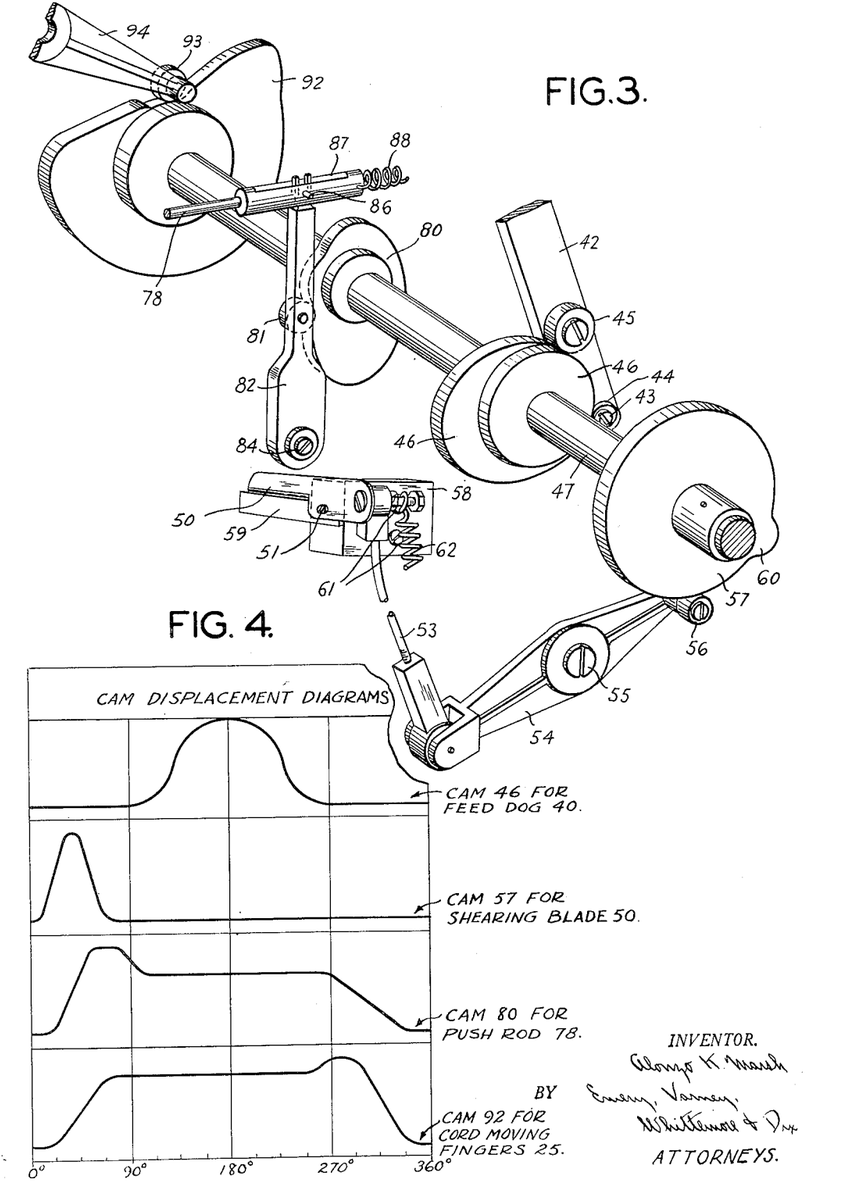
Figure 3 is an expanded, perspective view of the cam shaft and cam followers of the label attaching machine shown in Figures 1 and 2.
Figure 4 is a cam displacement diagram and illustrates the relative timing of the different operations of the machine.

The feed dog 40 is connected by a pivot 41 to a lever 42 that oscillates back and forth about a pivot 43 by which the lever 42 is supported from the frame of the machine. The pivot 43 is a stud on an eccentric 44 (Fig. 3) that can be rotated to shift the axis of the pivot 41 (Fig. 4). This provides an adjustment for the stroke of the feed dog 40.

A cam follower 45 (Figs. 2 and 3), carried by the lever 42, runs on a cam 46 secured to a cam shaft 47 which comprises the main drive shaft of the machine. The throw of the cam 46 is sufficient to move the feed dog 40 (Figure 1) through a stroke that advances the label strip for a distance equal to the length of one label. Shifting the pivot 43 does not change the length of the feed stroke but does change the point at which the forward stroke stops. This is important because it makes possible an accurate adjustment of the label feed.

There is a shearing blade 50 at one end of the guide 37 for cutting off each label 27 after the label has been pushed forward into position on the label support 28. The shearing blade 50 is supported by a pivot 51, and the blade is oscillated about this pivot, in timed relation with the other operations of the machine, by a link 53 (Figure 3), connected at its lower end to a rocker arm 54. This rocker arm 54 is moved about a fulcrum 55 by a cam follower 56 that runs on a cam 57 secured to the main drive shaft 47.

Figure 2:
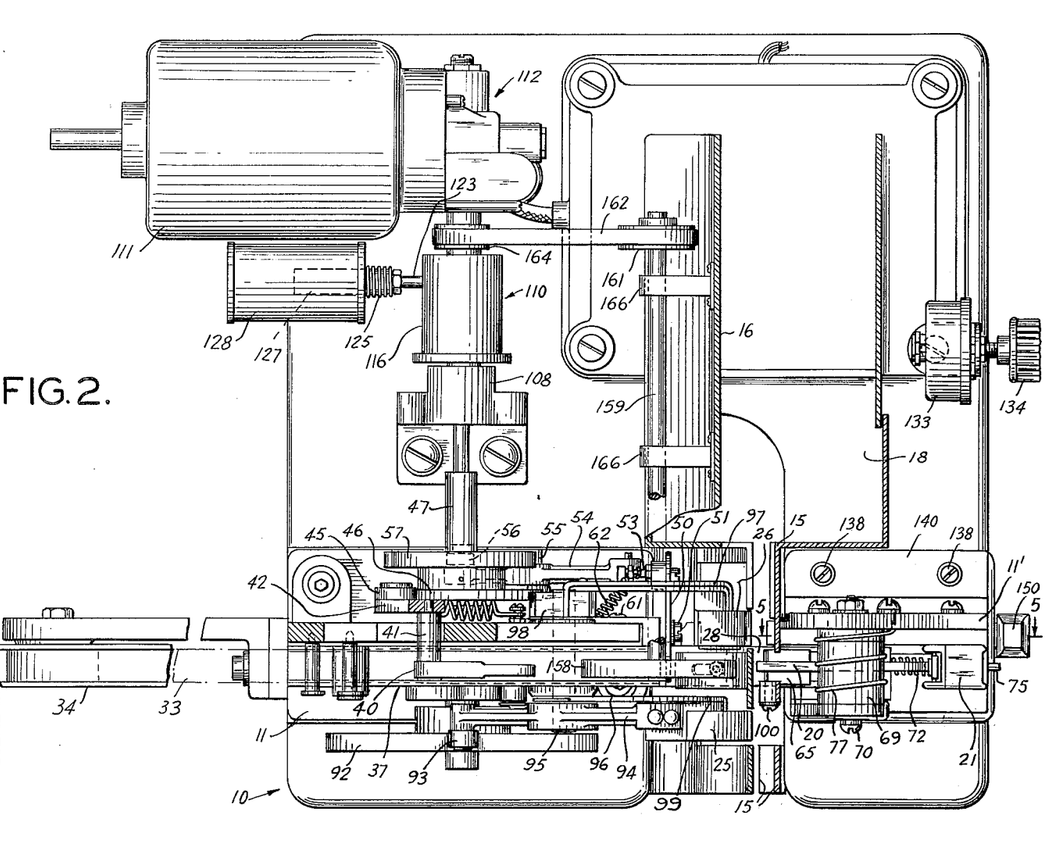
Figure 2 is a top plan view of the machine shown in Figure 1.

Referring again to Figure 3, there is a block 58 that provides a support for the pivot 51 on which the shearing blade 50 oscillates. A lower blade 59 is connected with the block 58 in a fixed relation with the block. This assembly comprising the block 58, lower blade 59, and the shearing blade 50 is attached at one side to the portion of the frame that serves as the guide for the label strip. The assembly is connected to the frame by screws 61, as shown in Figure 2, and whenever it becomes necessary to replace or recondition the shearing blades, the entire shearing assembly can be removed by taking out the screws 61.

There is one high point 60 (Figure 3) on the cam 57 for operating the shearing blade 50 to cut a label from the strip once during each cycle of operation of the machine. The shearing blade 50 is held out of the way of the label strip by a spring 62 when the shearing blade is not in operation. This spring 62, which is stretched between the upper end of the link 53 and a fixed point on the frame 11 serves also to hold the follower 56 in contact with the cam 57.

A housing 65 (Figure 1), at one end of the label support 28, holds one end of the label against displacement transversely on the label support, and there is a guide 66 in position to hold the other end of the label 27 in contact with the left-hand end of the label support.

The label support 28 comprises two separate plates located on top of the sealing elements 31 and 31'. In the preferred embodiment of this invention, the sealing element 31' is an electrically heated iron for fusing adhesive spread on the upper surface of the label 27 when the label is moved downward into the attaching station. The plates that comprise the label support are preferably made of heat insulating material so that the label 27 can not be scorched if it remains on the label support for a substantial period of time awaiting the delivery of another cord to the label support.

The sealing element 31 is rigidly attached to the frame 11, but the sealing element 31' is movable toward and from the sealing element 31, and is attached to a lever 69 which swings about a pivot 70 near the upper end of the frame 11'. A spring 72 urges the lever 69 toward the left to hold the sealing element 31' in contact with the other sealing element 31. This spring 72 is compressed between a lug 73 of the frame 11 and a rocket 74 that exerts pressure against the lower portion of the lever 69. A rod 75 attached to one end of the rocker 74 and extending at its other end through the lug 73 prevents transverse displacement of the spring 72, but leaves the spring 72 free to compress when the lever 69 is displaced toward the right to separate the movable sealing element 31' from the fixed sealing element 31.

In addition to the spring 72, there is a spring 77 (Figure 2) at the top of the lever 69 for urging the sealing element 31' (Figure 1) toward the fixed sealing element 31 with a light pressure when the pressure of the spring 72 is relaxed.

Apparatus is provided for periodically relaxing the pressure of the spring 72, and this apparatus includes a push rod 78 which periodically extends across the lower portion of the chute 15 to displace a slide 79 that extends through the lever 69 and into contact with the rocker 74. The movement of this push rod 78 is in timed relation with the operation of the other apparatus and is under the control of a cam 80 secured to the main drive shaft and the machine.

The cam 80 displaces a cam follower 81 carried by a lever 82. This lever 82 is supported from the frame 11 by a fulcrum pin 84, and the upper end of the lever 82 is forked to embrace a pin 86 in a slot 87 (Figure 3) at the right-hand end of the push rod 78. A spring 88 is attached at one end to the frame 11 by a screw 89 (Figure 1), and the other end of this spring 88 is connected to the push rod 78 to urge this push rod toward the left in Figure 1. The cam 80 moves the cam follower 81 to shift the push rod 78 against the force of the spring 88. The push rod 78 slides in a bearing 89 attached to the frame 11.

The movement of the cord through the label attaching machine is controlled by a cam 92 attached to the main drive shaft 47 and operating against a cam follower 93 at the lower end of a rocker arm 94. This rocker arm 94 is supported from the frame 11 by a fulcrum comprising a pivot shaft 95 to which the arm 94 is secured.

There are two cord moving fingers 25 and 26 (Figure 2) and they are located on opposite sides of the label support 28. The cord moving finger 25 is attached to the upper end of the rocker arm 94, and has a cord retainer 96 connected to it. The other cord moving finger 26 is connected by a retainer 97 to an arm 98 that is secured to the pivot shaft 95 and so as to move as a unit with the rocker arm 94. Since the cord moving fingers 25 and 26 contact the cord 23 on opposite sides of the label support 28, the cord is thrust downward evenly when the arms 94 and 98 rock clockwise on the pivot shaft 95.

The retainers 96 and 97 connected with the cord moving fingers 25 and 26 have outer surfaces which are substantially concentric about the axis of rotation of the rocker arm 94, best shown in Figure 1, and these surfaces serve as stops for preventing a cord 23 from moving downward in the chute after a cycle of operation has been started, and these retainers block the chute against another cord until the fingers 25 and 26 return to their starting positions at the end of a cycle of operation of the machine.

There is a cam surface 99 on the retainer 96, and this cam surface 99 cooperates with a cam follower 100, attached to the movable sealing element 31', near the end of a label sealing operation, as will be explained more fully in connection with Figures 9 to 14.

Immediately below the level of the sealing elements 31 and 31', there is a resilient support 103 which is connected to the push rod 78 for movement with the push rod in response to the operation of the cam follower 81. When this support 103 is shifted into a position under the sealing elements 31 and 31', it limits the downward movement of the cord 23 to a position in which the top of the cord is located immediately under the sealing elements 31 and 31' while the ends of the label remain clamped between the sealing elements long enough to fuse the adhesive.

The label attaching station of the machine is the region between the sealing elements 31 and 31' above the level of the support 103. It is within this region that the label is wrapped around the cord and attached to the cord by fusing the ends of the label together, as will be explained more fully in connection with Figures 9–14. The final discharge of the cord, with the label attached, may be effected by withdrawing the support 103 from beneath the sealing elements 31 and 31' after these sealing elements have released the flag of the label, or the discharge can be effected by withdrawing the support 103 first, and then releasing the clamping force of the sealing elements 31 and 31' on the table.

Figure 2 shows mechanism for operating the main drive shaft 47. This shaft extends through a bearing 108 and is connected with one side of a clutch 110. The driving side of the clutch 110 is operated continuously by a motor 111 through reduction gearing 112.

The clutch 110 includes an inside driving element secured to the output shaft of the reduction gearing 112, and an outside driven element 116 that is connected with the end of the shaft 47. The clutch 110 is a "non-repeat" or "one turn" clutch; that is, the driven element 116 makes one revolution each time that the clutch is engaged, and the clutch disengages at the end of the revolution unless the clutch controller is operated to renew the engagement. Such clutches are well known mechanical devices.

The controller for the clutch 110 includes a latch element 123 that is urged into the path of an abutment on the clutch by a spring 125. The latch element 123 is attached to the end of a plunger 127 which works in a solenoid 128.

When the solenoid 128 is energized, the plunger 127 and latch element 123 are pulled toward the left in Figure 2, to release the clutch abutment and permit engagement of the clutch. When the solenoid 128 is not energized, the spring 125 pushes the cam follower 123 into the path of the clutch abutment and causes the clutch to disengage.

The disengagement of the clutch 110 stops the rotation of the driven clutch element 116 and the shaft 47 until the solenoid 128 is again energized to withdraw the latch element 123. The cam apparatus of the machine is so designed that the machine makes one complete cycle of operation for each turn of the shaft 47.

The solenoid 128 is in the circuit of the switch 21 and is therefore energized each time that a cord depresses the operating arm 20 of the switch. This switch 21 is open except when the arm 20 is depressed.

A rheostat 133 is operated by a knob 134 to control the heating of the sealing element 31'; the resistance heating unit of the sealing element being located in series with the rheostat 133.

Figure 5:
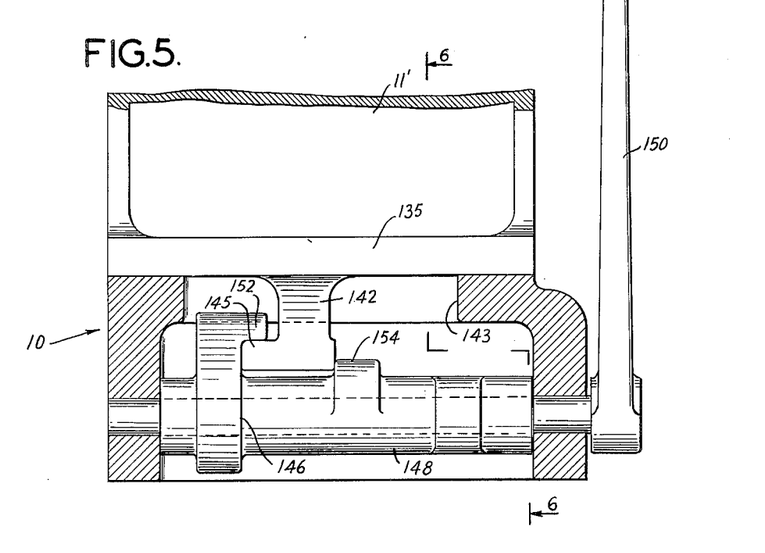
Figure 5 is an enlarged sectional view taken on the line 5—5 of Figure 2.
Figure 6:
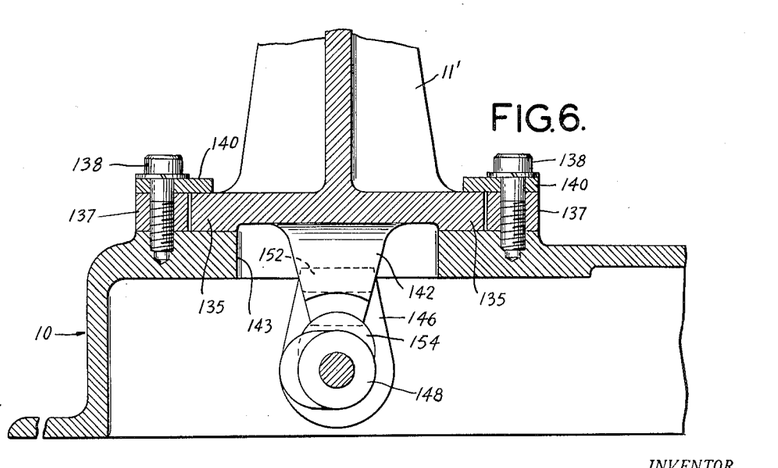
Figure 6 is a transverse sectional view taken along the line 6—6 of Figure 5.

The frame 11' at the right-hand side of the machine is movable with respect to the base 10 and the fixed frame 11 so that the machine can be opened up to remove any cords or labels that become jammed within it. The structure for moving the frame 11', and for locking it in operating position is shown in Figures 5 and 6.

The frame 11' has a bottom flange 135 which rests on surfaces of the base 10 between guide bars 137 (Figure 6) that are attached to the base 10 and screws 138. Cover strips 140, on top of the guide bars 137, extend beyond the guide bars 137 and out over the flanges 135 to prevent the frame 11' from being displaced upwardly. There is a running clearance between the flanges 135 and the strips 140 so that these cover strips and the guide bars 137 cooperate with the base 10 to form guideways along which the flanges 135 slide.

A lug 142 extends downward from the frame 11' through an opening 143 in the base 10. This lug 142 has an extension 145 (Figure 5) that strikes against a collar 146 when the frame 11' is in the position that it occupies when the machine is in operation.

The collar 146 is integrally connected with a shaft 148. This shaft has end bearings rotatable in the frame 10, and a handle 150 is attached to one end of the shaft 148 which extends beyond the base 10. The collar 146 has an overhanging portion 152 that engages the top of the lug extension 145 when the handle 150 is in an upright position. A shoulder 154 on the shaft 148 moves up into a position immediately behind the lug 142 when the handle 150 is upright.

The collar 146, with its overhanging portion 152, and the shoulder 154 lock the lug 142 in position to prevent movement of the frame 11' when the machine is in use. If it becomes necessary to pull the frame 11' away from the fixed frame of the machine, to remove cords or labels that have become jammed in the apparatus, the handle 150 is moved to rock the shaft 148 through an angle of approximately 90°, and this movement of the shaft 148 shifts the extension 152 and the shoulder 154 out of contact with the lug 142 and leaves the lug 142 free to move toward the right in Figure 5.

Figure 7:
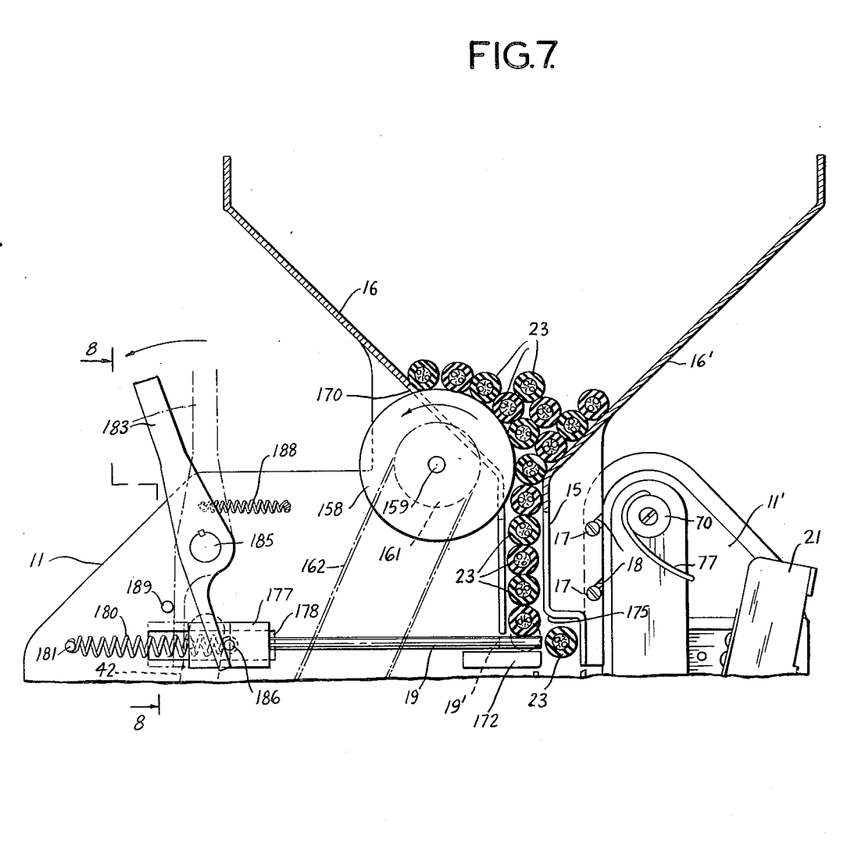
Figure 7 is a front view, partly in section, showing automatic cord feeding apparatus that is used with the machine of Figure 1.
Figure 8:
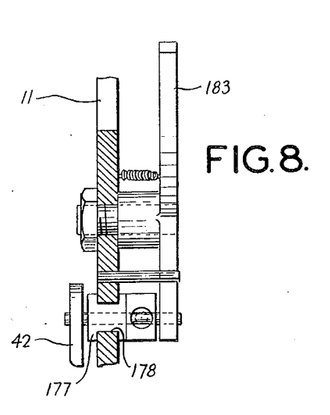
Figure 8 is a sectional view along the line 8—8 of Figure 8.

Figures 7 and 8 show the construction of automatic feeding mechanism for dropping successive cords down into the lower portion of the chute in timed relation with the label attaching operations of the machine. The cords 23 are placed in the open-ended hopper comprising the diverging side walls 16 and 16'. The chute 15 at the bottom of the hopper is only slightly wider than one of the cords so that the cords pile up in a stack with one cord above the other within the chute.

In order to prevent the cords from jamming against one another and forming an arch across the upper end of the chute 15, an agitator roller 158 is provided; and this roller 158 is attached to a shaft 159. There is a pulley 161, also attached to the shaft 159, and the pulley 161 is driven by a belt 162 to keep the agitator roller 158 in continuous rotation while the label attaching machine is in use.

The power drive for the belt 162 is shown in Figure 2. This belt 162 is driven from a pulley 164 connected with the driving side of the clutch 110. Figure 2 also shows hangers 166 by which the shaft 159 is supported from the wall 16 of the hopper. Referring again to Figure 7, the agitator roller 158 extends through a slot 170 in the wall 16 of the hopper, and this roller 158 turns in a counterclockwise direction so that its friction with the cords 23 tends to move the cords upward and prevents any jamming or arching over of the cords at the upper end of the chute 15.

When the end of the pusher 19 is retracted to the position indicated by the reference character 19', the stack of cords 23 in the upper portion of the chute rests on a supporting plate 172 at the offset portion of the chute. Each time the pusher 19 moves forward, that is, toward the right in Figure 7, the lowermost cord 23 of the stack resting on the supporting plate 172 is pushed off the plate 172, as illustrated in Figure 7, and is free to drop by gravity into the lower portion of the chute.

The pusher 19 can push only one cord at a time from the supporting plate 172 because the offset side of the chute 15 has a corner 175 at such a height above the supporting plate 172 that only one cord at a time can pass under this corner. When using the machine with smaller cords, the corner 175 must be closer to the level of the supporting plate 172 in order to prevent a second cord from being pushed from the stack at the same time that the bottom cord is pushed from the plate 172 by the pusher 19. When the machine is used with larger cords, it is necessary to raise the level of the corner 175 in order to provide sufficient clearance for the larger cords to pass under the corner. It is because of this necessity for adjusting the level of the corner 175 that the slots 18 are made diagonal to raise and lower the level of the corner 175 at the same time that the wall 16' is moved to increase or to decrease the width of the chute 15.

The pusher 19 is carried by a slide 177 which reciprocates in a slot 178 extending through the frame 11. The slide 177 is urged toward the left, to hold it in a retracted position by a spring 180 stretched between the slide 177 and a stud 181 extending from the frame 11.

For initially starting the machine, the pusher 19 and pusher slide 177 are operated manually by a starting lever 183. This lever rocks about a stud 185 and thrusts against a shaft 186 which extends from one side of the pusher slide 177. The starting lever 183 is normally held in an upright position, as indicated by the dot and dash lines, by a tension spring 188. When in such position, the starting lever 183 bears against a limit stop comprising a pin 189 extending from the side of the frame 11.

One end of the shaft 186 extends into the path of the upper end of the lever 42, and the pusher 19 and pusher slide 177 are operated automatically after the machine is initially set in operation by the lever 42 which also operates the label feed of the machine, as previously explained. When the machine is running, the lever 42 feeds a label into position for the next cord just before the completion of a cycle of operation. If there is a cord 23 on the support plate 172, the operation of the pusher 19, at the time that the new label is fed, pushes the new cord 23 from the support plate 172 and causes the new cord to drop down into the lower portion of the chute and initiate a new cycle of operation. When there are no more cords in the hopper, the operation of the pusher 19 is ineffective and the machine stops at the end of the cycle.

Figure 9:
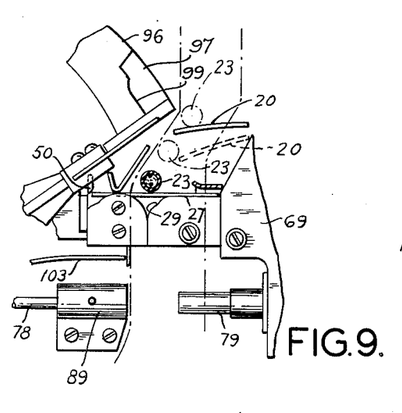
Figures 9–14 are fragmentary views showing the progress of a cord through the label attaching machine of the other figures.

Figures 9 to 14 show the operation of the machine. Figure 9 illustrates the way in which a cord 23, shown in broken lines, drops upon the operating arm 20 of the starting switch. The weight of the cord 23 depresses the operating arm 20 from the full line to the dotted line position shown. With the arm 20 in its depressed position, there is a clearance between the end of the arm 20 and the wall of the chute for the cord 23 to pass, and the cord drops from the arm 20 to a position on the label 27 midway between the ends of the label. The movement of the arm 20 by the cord 23 starts the operation of the machine by energizing the solenoid that operates the clutch, as previously described.

The first action of the cycle, after the cord has operated the arm 20 to close the control switch, is the severing of the label by the knife 50. In Figure 9 the knife is shown at the end of its cutting stroke and the label 27 is cut from the label strip. The advantage of cutting the label from the strip after the cord 23 has dropped into position on the label is that the label will not be displaced from its proper position by having the cord 23 fall upon it if the label has not been previously severed from the label strip.

Figure 10:
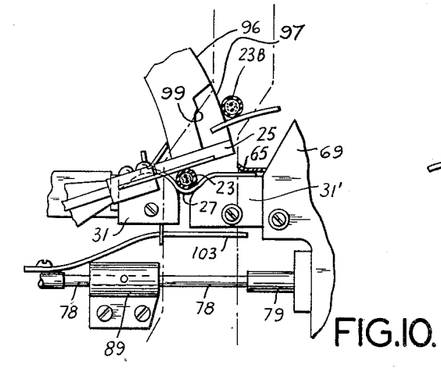

Figure 10 shows the movements of the apparatus during the first part of the cycle. The cord moving fingers 25 move down and push the cord 23 and the label 27 into the groove between the sealing elements 31 and 31'. This figure shows also the way in which the surface of the retainer 96 prevents another cord 23B from dropping down while the cord 23 is being labelled.

The push rod 78 moves toward the right into contact with the slide 79. Further movement of the push rod 78 displaces the slide 79 and relieves the heavy spring pressure that urges the sealing element 31' into contact with the fixed sealing element 31. With only the light spring pressure at the top of the lever 69 to overcome, the downward pressure of the cord 23 and the label 27 against the sloping sides of the groove 29 causes the sealing element 31' to move away from the fixed sealing element 31. The resilient support 103 moves out under the opening gap between the sealing elements 31 and 31'.

Figure 11:
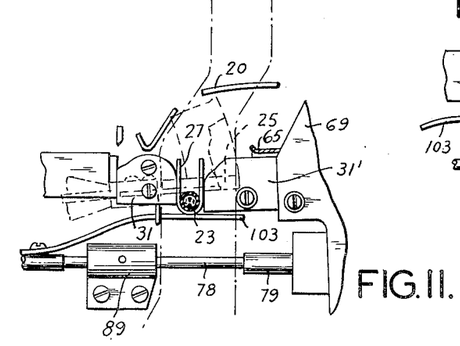

Figure 11 shows the positions of the parts as the cord moving fingers 25 continue their downward movement and push the cord 23 and label 27 downward between the sealing elements 31 and 31'. During this movement of the cord 23, the sealing elements 31 and 31' wrap the label 27 part way around the cord, and the bottom of the label comes into contact with the resilient support 103. In Figures 11–14 the fingers 25 and their connected parts are shown in dotted lines so as not to confuse them with other structure that they cover.

Figure 12:
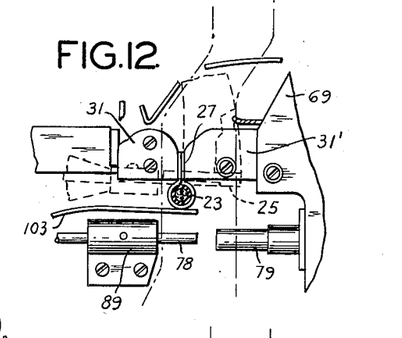

Figure 12 shows the next step in the label attaching operation. The cord moving fingers 25 have pushed the cord 23 downward and bent the resilient support 103 down into a position where the cord 23 is supported with its top surface just below the bottom of the sealing elements 31 and 31'. With the cord in this position, the ends of the label 27 remain between the sealing elements 31 and 31' which move together again under heavy spring pressure as the push rod 78 retreats.

Figure 13:
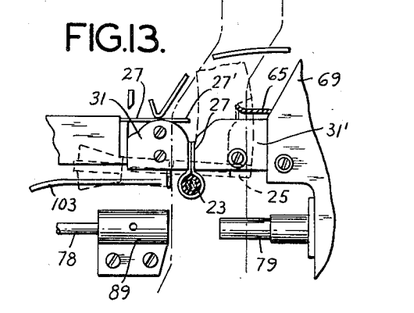

Figure 13 shows the parts at the end of the label sealing operation. The cam that operates the cord moving fingers 25 is designed to cause the fingers 25 to dwell in the position shown in Figures 12 and 13 for a period long enough to permit the sealing elements 31 and 31' to fuse the adhesive on the label 27 and thus seal the ends of the label together. In the operation illustrated in Figure 13, the support 103 is completely withdrawn from beneath the cord 23 while the flag ends of the label 27 remain clamped between the sealing elements 31 and 31'. The cord 23 is thus supported by the label. During this part of the cycle a new label 27' is being fed into position on the label support 28. The machine wraps the label tightly around the cord and sticks the ends together to form a flag with the ends approximately even. The sealing elements also cause part of the label to stick to the cord so that the label remains in a predetermined position on the cord. Although the apparatus illustrated in the drawing attaches the labels with thermo-plastic adhesive, it will be understood that the machine can also be used to apply flag labels with pressure sensitive adhesive, in which case neither of the sealing elements need be heated.

Figure 14:
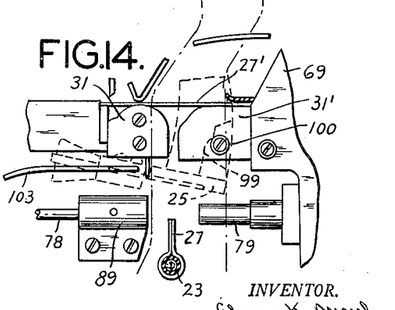

Figure 14 shows the operation of the cam surface 99 which thrusts the cam follower 100 to the right to move the sealing element 31' away from the fixed sealing element 31 as the cord moving fingers 25 resume their downward movement. The cord 23 and label 27 are discharged from the label attaching station both by the action of gravity, as the label is released from between the clamping faces of the sealing elements 31 and 31', and by the positive displacement of the cord moving fingers 25.

From the positions shown in Figure 14, the cord moving fingers 25 travel back to their original positions shown in Figure 9, and the machine is then ready to start another cycle of operation.

The preferred embodiment of the invention has been illustrated and described, but changes and modifications can be made and some features of the invention can be used alone or in different combinations without departing from the invention as defined in the claims.

I claim as my invention:

1. A flag label attaching machine including apparatus for feeding a label into position adjacent an attaching station, apparatus that supplies successive cords into a position adjacent the label, apparatus for wrapping the label around the cord with the flag ends of the label in confronting relation, said apparatus for wrapping including devices for sealing the label, and common operating mechanism that actuates all of said apparatus through a cycle and in timed relation.

2. A flag label attaching machine comprising an attaching station, a device for positioning a label adjacent the attaching station, means for guiding a cord into a position in contact with the label, cord moving apparatus for advancing the cord and label through the attaching station, apparatus for wrapping the label around the cord with the flag ends of the label in confronting relation, said apparatus including devices for sealing the label, common operating mechanism that actuates all of the said apparatus through a cycle and in timed relation, a controller for the operating mechanism, and an operating arm for said controller associated with the cord guiding means in position to be operated by the weight of a cord in the cord guiding means.

3. A label attaching machine comprising a cord chute, cord moving apparatus that pushes a cord in the chute downward to a label attaching station of the machine, a cord retainer connected to and movable with the cord moving apparatus for preventing a second cord in the chute from moving to the attaching station while said cord moving apparatus is operating to move the first cord to the label attaching station, and label wrapping and sealing apparatus at the attaching station and past which successive cords are moved by the cord moving apparatus.

4. A label attaching machine comprising a cord chute, label wrapping apparatus, apparatus for sealing a label after wrapping of the label on the cord, cord moving apparatus that pushes a cord downward through the label wrapping and sealing apparatus, means associated with the cord moving apparatus for preventing a second cord from being moved downward to the label wrapping and sealing apparatus while said cord moving apparatus is operating to move the first cord through the label wrapping and sealing apparatus, and timed operating mechanism that displaces the cord moving apparatus in accordance with a given cycle and in steps that determine the position of the cord at different instances during the cycle and that determines the length of time that the cord is being wrapped and the length of time that the label is subjected to the operation of the sealing apparatus.

5. A label attaching machine including a label attaching station, a label support immediately above said attaching station, a device for feeding a label transversely into position on the label support, means for bringing a cord into a position in which the cord rests on an intermediate portion of the label on the label support, and apparatus for pushing the cord and label downward into the label attaching station, said cord moving apparatus comprising elements that contact with the cord on both sides of the support on which the label rests.

6. A label attaching machine including a two-part label support, apparatus for moving one part of the support toward and from the other to provide a space between said parts during a portion of the cycle of operation of the machine, a groove in the label support at the region where the parts of the label support come together, a device for moving a label into a position on the support in which the label extends beyond both sides of the groove, means for introducing a cord into a position in which the cord rests on the label immediately above said groove, cord moving apparatus that pushes the cord and label downward into the groove to cause the parts of the label support to move apart.

7. A label attaching machine including a two-part label support, apparatus for moving one side of the support toward and from the other, a device for positioning a label on top of the support in a position overlying both parts of the support, means for positioning a cord on the label above the region at which the movable part of the support contacts with the other part of the support, cord moving apparatus for thrusting the cord downward with respect to the support, and mechanism for coordinating the operation of the cord moving apparatus with the movement of one part of the support away from the other part of said support.

8. Apparatus for attaching flag labels to electric cords said apparatus comprising a label support, irons in contact with one another immediately below said support and at least one of which is electrically heated, mechanism for moving said irons away from and toward one another, cord moving apparatus that pushes a cord and an underlying label downward between said irons to wrap the center portion of the label around the cord, and means for bringing the irons together to clamp the ends of the label above the cord together to seal the label ends and thus connect the label and the cord.

9. Apparatus for applying to a cord a flag label that is coated with heat sealing adhesive, said apparatus comprising two irons that are held together with a clamping pressure and at least one of which is electrically heated, apparatus for relieving said clamping pressure so that one of said irons is movable with respect to the other to leave a space between them for passage of a cord and label, a label support immediately above the irons and on which a label is supported and heat insulated from the irons to prevent scorching, apparatus for pressing a cord against an intermediate portion of a label on the support, mechanism for displacing the cord moving apparatus in timed relation with the relief of the clamping pressure on the irons to push a label and cord downward between the irons so that the irons wrap the label around the cord, the apparatus for relieving the clamping pressure being operative to bring the irons together under clamping pressure immediately after passage of the cord between the irons so as to clamp and seal the extending flag ends of the label that is wrapped around the cord.

10. A label attaching machine including sealing elements movable toward and from one another, a label support on which a label is held in position above the sealing elements and heat insulated from said elements, apparatus for moving a cord downward against an intermediate portion of the label, mechanism for operating the cord moving apparatus in synchronism with the movement of the sealing elements to cause the sealing elements to wrap the label around the cord as the cord and label are pushed downward between said sealing elements.

11. A label attaching machine including in combination sealing elements, apparatus for moving a label downward between the sealing elements by pressing a cord against a mid-portion of the label to move the cord downward and wrap the label around the cord as said cord moves between the sealing elements, a support for holding the cord temporarily stationary at a level just below said sealing elements, and mechanism operating in timed relation to the cord moving apparatus for thrusting the sealing elements together against the end portions of the label to seal said end portions together.

12. A label attaching machine comprising sealing elements movable toward and from one another to provide a space through which a cord and label can pass, apparatus for moving a label downward between the sealing elements by pressing a cord against the top surface of the label intermediate the ends of the label, a support below the sealing elements in position to hold the cord with its upper surface substantially even with the lower ends of the sealing elements, mechanism for forcing the sealing elements together while the cord is thus supported, and mechanism for moving the support transversely of the cord to leave the space below the cord and label unobstructed for subsequent delivery of the cord and label from the machine.

13. The combination called for in claim 12 and in which the sealing means comprise electric irons that grip the end portions of the label above the cord to seal adhesive on the label with heat, and mechanism operating in timed relation with the support for moving the sealing elements apart to drop the label and cord after the support has been withdrawn.

14. A label attaching machine comprising a label support, a pair of sealing elements below the label support and movable toward and from one another, cord moving apparatus that pushes a cord downward against an intermediate portion of a label on the support, means for separating the sealing elements to provide space through which the cord and label are pushed while the label wraps around the cord, a support immediately below the sealing elements for holding the cord and label in a position with the cord located immediately below the sealing elements while the ends of the label are clamped between the elements for sealing, and means on the cord moving apparatus for separating the sealing elements upon further downward movement of said cord moving apparatus.

15. Label attaching apparatus including an attaching station, a holder above the attaching station and on which a number of articles to be labeled are adapted to rest, article moving apparatus operable to move one article at a time downward into the label attaching station, and a retainer connected to and movable with the article moving apparatus, said retainer including a surface that moves into position to prevent a second article from moving downward toward the label attaching station while the cord moving apparatus is depressed.

16. A label attaching machine including a label support, sealing means movable away from one another to provide a gap through which the cord and label are movable, a support located immediately below the sealing elements and on which the cord rests while the ends of the label remain clamped between the sealing elements, a delivery chute below said support and into which the cord and attached label drop after the machine has attached the label to the cord, cam means for operating the various parts of the machine in timed relation with one another including a cam that moves the cord moving apparatus downward with an intermittent motion, the periods of which determine the length of time that the cord and label remain in any given position and that determine the speed with which the cord and label travel from one position to another during the operation of the machine.

17. In an automatic label attaching machine for attaching labels to cords, a hopper comprising converging side walls that have their lower ends extending downward and into substantially parallel relation to form a chute, an offset in the chute including a support at an intermediate level on one side of the chute, and a shoulder at a slightly higher level on the other side of the chute, fixed supports to which the respective walls are connected, releasable fastening elements attaching the wall on the shoulder side of the chute to its fixed support, slots through which the fastening elements extend, said slots sloping upward as they extend away from the chute so that adjustment of the movable wall to increase the width of the chute also raises the height of the shoulder in the chute.

18. In a label attaching machine for wrapping labels around cords and securing the labels, a chute for supplying cords to label wrapping and adhering apparatus at the lower end of the chute, a hopper at the upper end of the chute, an agitator in the hopper for causing the cords to drop into the chute one above the other, a support at an intermediate level of the chute for holding a stack of cords extending up to the hopper, a pusher movable back and forth to displace one cord at a time from the support, and mechanism for operating the pusher in timed relation with the wrapping and adhering apparatus of the machine.

19. In a label attaching machine for wrapping labels around cords and securing the labels, a chute for supplying cords to label wrapping and adhering apparatus at the lower end of the chute, a hopper at the upper end of the chute, an agitator in the hopper for preventing the cords from jamming at the bottom of the hopper, feeder means below the agitator for feeding one cord at a time to the label wrapping and adhering apparatus, and mechanism that operates the feeder means in timed relation with other apparatus of the machine.

20. In a label attaching machine including a hopper for holding a group of cords to which labels are to be attached, a chute extending downward from the bottom of the hopper, a feeder for supplying one cord at a time to the label wrapping and adhering apparatus, mechanism that operates the feeder in timed relation with other apparatus of the machine, and a manually operated control for the feeder for feeding the first cord when starting the operation of the machine.

21. A label attaching machine comprising a holder for a group of cords, a guide chute, a feeder for causing one cord to drop down the guide chute during each cycle of operation of the machine, label wrapping and adhering apparatus at the lower end of the guide chute, a controller for starting a cycle of operation of the machine, said controller having an element in the path of a cord that drops from the feeder to the label wrapping and adhering apparatus, and mechanism for operating the feeder in timed relation with the wrapping and adhering apparatus and near the end of each cycle of operation of the machine.

22. A label attaching machine comprising label wrapping and adhering apparatus, label feeding apparatus for supplying labels to the wrapping and adhering apparatus, a chute for guiding successive cords to the wrapping and adhering apparatus, cord feeding apparatus for causing one cord to drop down the chute for each cycle of operation of the machine, a one turn clutch, motion transmitting connections through which all of said apparatus is operated from the one turn clutch and by which the feeder apparatus is operated near the end of a cycle, and control means actuated by a cord from the feeder for engaging the one turn clutch.

23. A machine for wrapping and securing flag labels to cords, said machine including power driving mechanism, an automatic stop for discontinuing the operation of the machine by the power driving mechanism at the end of each cycle of the machine, a holder for a group of cords, feeder mechanism for supplying one cord at a time from the holder to an attaching station, apparatus for wrapping and adhering a label on a cord at the attaching station, control means actuated by movement of a cord through the machine for initiating another cycle of operation of the machine by the power driving mechanism, and a manually actuated device for operating the control means to start another cycle of operation of the machine by said power driving mechanism.

24. In a label attaching machine for wrapping labels around cords and securing the labels on the cords, a hopper for holding a group of cords, an agitator comprising a friction wheel extending through a slot in one side of the hopper near the bottom of the hopper, a continuously operating motor, motion transmitting connections through which the agitator is rotated continuously from said motor, a chute extending downward from the bottom of the hopper, a supporting platform in the chute for holding a stack of cords one above the other, a feeder for pushing the lowermost cord of the stack from the support to cause the cord to drop down to the lower end of the chute, label feeding means for supplying successive labels to the lower end of the chute, a shearing device for cutting off the end label from a supply strip, cams for operating the feeder, and the label feeding means in accordance with a given sequence and with the cord feeder operative near the end of each cycle of the machine, a one turn clutch through which power from the motor is transmitted to the cams, control means for causing the clutch to engage to initiate a cycle of operation of the machine, said control means including an element in position to be actuated by the movement of another cord from the cord feeder, and a manually actuated device for operating the cord feeder to start an initial operating cycle of the machine.

25. In a machine for wrapping flag labels around cords and securing the ends of the labels to each other and the labels to the cords, a frame, a guide located on the frame and along which a strip of connected labels is fed toward one end of the guide, a label attaching station beyond that end of the guide, a shearing assembly comprising shearing blades, at least one of which is movable, and a support for the shearing blades, fastening means securing said support to the frame of the machine in a position that locates the shearing blades between the end of the guide and the label attaching station, said fastening means being detachable so that the shearing assembly can be removed from the machine as a unit when the shearing blades are to be reconditioned, and mechanism for operating the shearing blades in timed relation with the other operation of the machine.

ALONZO K. MARSH.

REFERENCES CITED

The following references are of record in the file of this patent:

UNITED STATES PATENTS

| Number | Name | Date |
| --- | --- | --- |
| 1,700,005 | Wall | Jan. 22, 1929 |
| 2,050,455 | Ohlsen et al. | Aug. 11, 1936 |
| 2,129,897 | Williams | Sept. 13, 1938 |